(12) United States Patent
Gale et al.

(10) Patent No.: US 6,334,107 B1
(45) Date of Patent: Dec. 25, 2001

(54) METHOD OF MANAGING A REAL ESTATE UNIT

(75) Inventors: Donald Gale, Dallas, TX (US); Michael Delfonso, Naples, FL (US)

(73) Assignee: Rental Tracker, Dallas, TX (US)

( * ) Notice: Subject to any disclaimer, the term of this patent is extended or adjusted under 35 U.S.C. 154(b) by 0 days.

(21) Appl. No.: 09/244,960

(22) Filed: Feb. 4, 1999

(51) Int. Cl.⁷ .................................................. G06F 15/18
(52) U.S. Cl. ................................................. 705/10; 705/1
(58) Field of Search ............................ 705/1, 10, 38; 707/104

(56) References Cited

U.S. PATENT DOCUMENTS

| | | | |
|---|---|---|---|
| 5,086,385 | * 2/1992 | Launey et al. | 364/188 |
| 5,161,109 | * 11/1992 | Keating et al. | 705/410 |
| 5,584,025 | * 12/1996 | Keithley et al. | 707/104 |
| 5,680,305 | * 10/1997 | Apgar, IV | 705/10 |
| 5,893,091 | * 4/1999 | Hunt et al. | 707/3 |
| 5,978,807 | * 11/1999 | Mano et al. | 707/10 |
| 6,020,881 | * 2/2000 | Naughton et al. | 345/327 |
| 6,023,687 | * 2/2000 | Weatherly et al. | 705/38 |
| 6,049,781 | * 4/2000 | Forrest et al. | 705/30 |
| 6,115,713 | * 5/2000 | Pascucci et al. | 707/10 |
| 6,157,943 | * 12/2000 | Meyer | 709/203 |
| 6,198,479 | * 3/2001 | Humpleman et al. | 345/329 |

FOREIGN PATENT DOCUMENTS

411250124A * 9/1999 (JP) ............................ G06F/17/60

OTHER PUBLICATIONS

IBM Helps RTC Automate Real Estate Tracking System. "Gale Group Newsletter." vol. 8, No. 8 (Feb. 20, 1991) pp. 1–2.*

Home Works: Integrated Lighting Control System "LUTRON: Residential Systems Division" (1993) pp. 1–20.*

Smart House Installer/Designer: The Smart Bridge (Smart Interface Corporation) (1992) pp. 1–7.*

* cited by examiner

Primary Examiner—James P. Trammell
Assistant Examiner—John Leonard Young
(74) Attorney, Agent, or Firm—Welsh & Katz, Ltd.

(57) ABSTRACT

A method and apparatus are provided for managing a real estate unit from a remote location. The method includes the steps of accessing a server from a remote location through a website of the server and downloading a set of options regarding the managing of the rental unit from the website to the remote location. The method further includes the steps of selecting at least one of the options, uploading the selected option from the remote location to the server and executing the uploaded selected option by the server.

24 Claims, 12 Drawing Sheets

FIG. 13

Resident Inquiry Screen

SAMPLE PROPERTY
RESIDENT SCREEN   ■ 8:48:59 am unit no. ___ ⌒74        move in date ___ ⌒76        renewal start ___ ⌒98
type ___ ⌒92            lease start ___ ⌒78         renewal end ___ ⌒100
cert. date ___ ⌒94      lease end ___ ⌒80
hud ___ ⌒96             move out date ___ ⌒90 name           ⌒102                    name           ⌒104
ss#                      phone #       ss#                      phone #
employer                                employer
occupation                              occupation emergency contact                      phone # adults      children      pool pass      pets      auto      lic. no.

name
attn
address         ⌒106
city
  st    zip

Unit Inquiry Screen

RENTAL TRACKER        UNIT SCREEN        ■ 8:49:02 am
                      SAMPLE PROPERTY

Unit No. ___     Type ___     Cert ___     Date ___     Avail ___
        ⌒110          ⌒112         ⌒114         ⌒116           ⌒118
Addr
City         ___
  St.   Zip    120

Act. rnt. ___ ⌒122      Class    130    Decorated ___ ⌒132    Sq. Footage ___ ⌒140
Mkt. rnt. ___ ⌒124      Rooms           Carpet in ___ ⌒134    Percentage ___ ⌒142
Cont. rnt. ___ ⌒126     Bdrms           Cleaned ___ ⌒136      Revenue ytd ___ ⌒144
Sec. dep. ___ ⌒128      Baths           Color ___ ⌒138        G/L acct. ___ ⌒146

Appliance      Purchase Date      Warr. Date      I.D. no.      3mo.      1yr.

Building Inquiry Screen (with sample data)

```
RENTAL TRACKER          SAMPLE PROPERTY              ■ 8:49:20 am
                        BUILDING SCREEN
building no. 1    152              construction date        01/87
addr 1000 Easy Street              type of construction    Apartment
city  Dallas         153           gross rental area         0.00
 st   TX  zip  75246               gross potential           0.00
          invoice address          market potential          0.00
payable to RENTAL TRACKER, INC     ytd vacant                0.00
    mail to SAMPLE PROPERTY   155  g/l account
     addr  1000 EASY STREET        real estate tax           0.00
     city  DALLAS                                        154
      st   TX  zip  75246      158
floors        0          children         heat
units         0          pets             a/c        160
one bdrm      0          furn'ed          appl.
two bdrm      0          carpet                   laundry
three bdrm    0          elevator         washer  0    dryer  0

162         156    maintenance person (s)
name                             name
addr                             addr
ph.#                             ph.#
Press ENTER to return to menu.
                                                         150
```

FIG. 16

Property Inquiry Screen (with sample data)

```
RENTAL TRACKER         SAMPLE PROPERTY              ■ 8:49:23 am
            166        PROPERTY SCREEN
unit type 1=Rental    children         buildings  1   gross rental area        0.00
fiscal year starts  1 pets             units     36   ytd billed              24.00
                      furn'ed          garages    0   ytd received    170     24.00
construction date 01/87 pools          carports   0   ytd vacant               0.00
first occupance   06/87 tennis         stalls     0    168     176 owner pays:          current cash receipt :      174     LATE: limit:   75.00
  water              last batch number  449 dated 07/09/91    charge1:   0.00
  gas     172        last batch amount         0.00           charge2:   0.00
  electric           month total           3220.00            charge3:   0.00
appliance   qty        owned by        serviced by    contract terms
            0
            0
            0
            0                            178
            0
            0
            0
Press ENTER to return to menu.
                                                         164
```

FIG. 17

Owner Inquiry Screen (with sample data)

```
RENTAL TRACKER           OWNER SCREEN              ■ 8:49:27am

PROPERTY - no. 5    ← 182   184 →  TITLE HOLDER
   control date 07-91                   name
   name  SAMPLE PROPERTY
   addr 1000 Easy Street      186 →  MORTGAGE
   city  Dallas                         #1
   st  TX  zip  75246                   #2

← 188
   OWNER/INVESTOR
     name                              name
     ss#      - -    100.00  %         ss#      - -     0.00  %
     addr                              addr
     city                              city
     st         zip                    st         zip name                              name
     ss#      - -      0.00  %         ss#      - -     0.00  %
     addr                              addr
     city                              city
     st         zip                    st         zip Press ENTER to return to menu.
                                                          180
```

FIG. 18

Detail Billing Inquiry Screen (with sample data)

```
CP 07-91              SAMPLE PROPERTY            ■ 8:49:37am
                  DETAILED BILLING INFORMATION
  code    amount  credit#  start  end   control  comments       amt received
  1. RNT   350.00          06/91  06/92  07-91   RENTAL              0.00
  2. SAD   100.00          07-91  07-91  07-91   SECURITY DUE      100.00
  3. APP    10.00          07-91  07-91  07-91   APPLICATION         0.00
  4. PK     25.00          07-91  07-91  07-91   PARKING             0.00
  5. DAM    10.00          07-91  07-91  07-91   UNIT DAMAGE         0.00
                                                              ↙
                                                            194

Press Previous, Next, or ENTER to continue.
  total due  485.00  total received  100.00  balance due   385.00
  unit no.  101  -1  RALPH ANDERSON

[View]     [Add]     [Delete]    [Quit]
         192 ↲       194 ↲      196 ↲        198 ↲       190
```

FIG. 19

Cash Entry Screen 1

```
                    SAMPLE PROPERTY              ■ 8:50:09am
                  CASH TRANSACTION SCREEN          CP 07-91
  Batch Number      450              Tape Total      1000.000
  Transaction Date  12/05/98         Actual Total
                                     Balance code   start   end   charge   received   credits   balance   amt applied
   [  ]   [  ]   [  ]   [  ]     [  ]       [  ]      [  ]      [  ]
   ᒪ202   ᒪ204   ᒪ206   ᒪ208      ᒪ210       ᒪ212      ᒪ214      ᒪ216
                    IS THE AMOUNT CORRECT ? Y

[Previous]      [New]       [ENTER]       [Quit]
                                        218ᒧ unit no. 1  -101   -1      RALPH ANDERSON      reference # 1234
   amount received     500.00      amount applied         Unapplied
                                                               •

Cash Entry Screen 2

```
                    SAMPLE PROPERTY              ■ 8:50:12am
                  CASH TRANSACTION SCREEN          CP 07-91
  Batch Number      450              Tape Total      1000.000
  Transaction Date  12/05/98         Actual Total     500.00
                                     Balance          500.00 code    start    end    charge   received   credits   balance   amt applied
  1. RN    06/91   06/92   350.00     0.00      0.00     350.00       0.00
  2. SAD   07-91   07-91   100.00   100.00      0.00       0.00       0.00
  3. APP   07-91   07-91    10.00     0.00      0.00      10.00       0.00
  4. PK    07-91   07-91    25.00     0.00      0.00      25.00       0.00
  5. DAM   07-91   07-91    10.00     0.00      0.00      10.00       0.00
                                   ᒥ228

Press Previous, Next, or ENTER to continue.
  unit no. 1  -101   -1      RALPH ANDERSON      reference # 1234
  amount received    500.00      amount applied   0.00    Unapplied  500.00
  220               222ᒧ                         224ᒧ       226
```

FIG. 21

```
Cash Entry Screen 3
```

|  |  | SAMPLE PROPERTY<br>CASH TRANSACTION SCREEN |  |  |  | ■8:50:33 am<br>CP 07-91 |
|---|---|---|---|---|---|---|
| Batch Number | 450 |  |  | Tape Total | 1000.000 | |
| Transaction Date | 12/05/98 |  |  | Actual Total | 500.00 | |
|  |  |  |  | Balance | 500.00 | |

| code | start | end | charge | received | credits | balance | amt applied |
|------|-------|-----|--------|----------|---------|---------|-------------|
| 1. RN | 06/91 | 06/92 | 350.00 | 0.00 | 0.00 | 350.00 | 0.00 |
| 2. SAD | 07-91 | 07-91 | 100.00 | 100.00 | 0.00 | 0.00 | 0.00 |
| 3. APP | 07-91 | 07-91 | 10.00 | 0.00 | 0.00 | 10.00 | 0.00 |
| 4. PK | 07-91 | 07-91 | 25.00 | 0.00 | 0.00 | 25.00 | 0.00 |
| 5. DAM | 07-91 | 07-91 | 10.00 | 0.00 | 0.00 | 10.00 | 0.00 |

— 232
[ Quit ]

Bal due 0.00
unit no. 1 -101 -1 RALPH ANDERSON reference # 1234
amount received 500.00 amount applied 385.00 Unapplied 115.00

```
Billing Code Maint. Screen
```

■8:52:41 am

| Editing Keys |
|---|
| ^W - Save Changes |
| ^N - Add a New Code |
| ^T - mark to Delete |
| ^Q/Esc - Exit with |
|   no changes |

| Billing Code Maintenance Utility |  |  |
|---|---|---|
| Code | Account # | Description |
| ACT | 1007 | ACCT. TRANSFER |
| ADJ | 1004 | ADJUST BALANCE |
| APP | 1001 | APPLICATION |
| DAM | 1200 | UNIT DAMAGE |
| INT | 1050 | INTEREST |
| LC |  | LATE CHARGE |
| LF | 5900 | LATE FEES |
| LO |  | LOCK-OUT |
| MF | 1088 | MANAGER FEE |
| MGF | 1008 | MGMT. FEES |
| MI |  | MISC. |
| MIB | 1003 | MOVE IN BONUS |
| NSF | 1004 | NSF CHECK |
| PET | 1007 | PET DEPOSIT |

234

236 238 240

US 6,334,107 B1

METHOD OF MANAGING A REAL ESTATE UNIT

FIELD OF THE INVENTION

The field of the invention relates to property management and more particularly to a method of managing a real estate unit from a remote location.

BACKGROUND OF THE INVENTION

Methods of obtaining information over the Internet are known. For instance, many retailers maintain websites providing information on products and services offered by the retailer.

To provide a path to the website, a retailer may identify a series of descriptive terms or keywords that may be associated with a particular product. The descriptive terms and keywords may then be entered into a searchable database of an Internet search engine (e.g., Yahoo, Webcrawler, etc.). Stored in the database along with the descriptive word or keyword is an Internet protocol (IP) address of the retailer.

A user may access the website of the retailer directly (if he knows the IP address of the retailer) or indirectly through the search engine. Once the user has accessed the website, he may first be required to enter a descriptive term or keyword of the desired product.

In response, the search engine may return an identifier of the retailer and an embedded hyperlink to the retailer. The user may then select the retailer and, in turn, be routed to the retailer's website.

Once at the retailer's website, the user may arrive at a home page and be allowed to browse through subsequent pages of the website, going from one page to another. Access to subsequent pages may be provided through a menu downloaded to the user or through a local search engine resident within the website.

While at the website of the retailer, the user may decide to purchase certain merchandise presented through the website. To accomplish a purchase, the user may be requested to enter a credit card number or other indication of financial responsibility. Upon checking the authenticity of any entered credit card number, the retailer may complete the transaction by forwarding the merchandise.

While the use of websites for merchandising has proved successful, the information exchange capacity of Internet websites far exceeds current usage. Accordingly a need exists for a way of expanding website usage to other business purposes, such as property management.

SUMMARY

A method and apparatus are provided for managing a real estate unit from a remote location. The method includes the steps of accessing a server from a remote location through a website of the server and downloading a set of options regarding the managing of the rental unit from the website to the remote location. The method further includes the steps of selecting at least one of the options, uploading the selected option from the remote location to the server and executing the uploaded selected option by the server.

BRIEF DESCRIPTION OF THE DRAWINGS

FIG. 13 is a resident inquiry screen of the system of FIG. 1;

FIG. 14 is a unit inquiry screen of the system of FIG. 1;

FIG. 15 is a building inquiry screen of the system of FIG. 1;

FIG. 16 is a property inquiry screen of the system of FIG. 1;

FIG. 17 is a owner inquiry screen of the system of FIG. 1;

FIG. 18 is a detail billing inquiry screen of the system of FIG. 1;

FIG. 19 is a cash entry screen of the system of FIG. 1;

FIG. 20 is a cash entry detail screen of the system of FIG. 1;

FIG. 21 is a cash entry summary screen of the system of FIG. 1; and

FIG. 22 is a billing code maintenance screen of the system of FIG. 1.

DETAILED DESCRIPTION OF A PREFERRED EMBODIMENT

Figure 1:
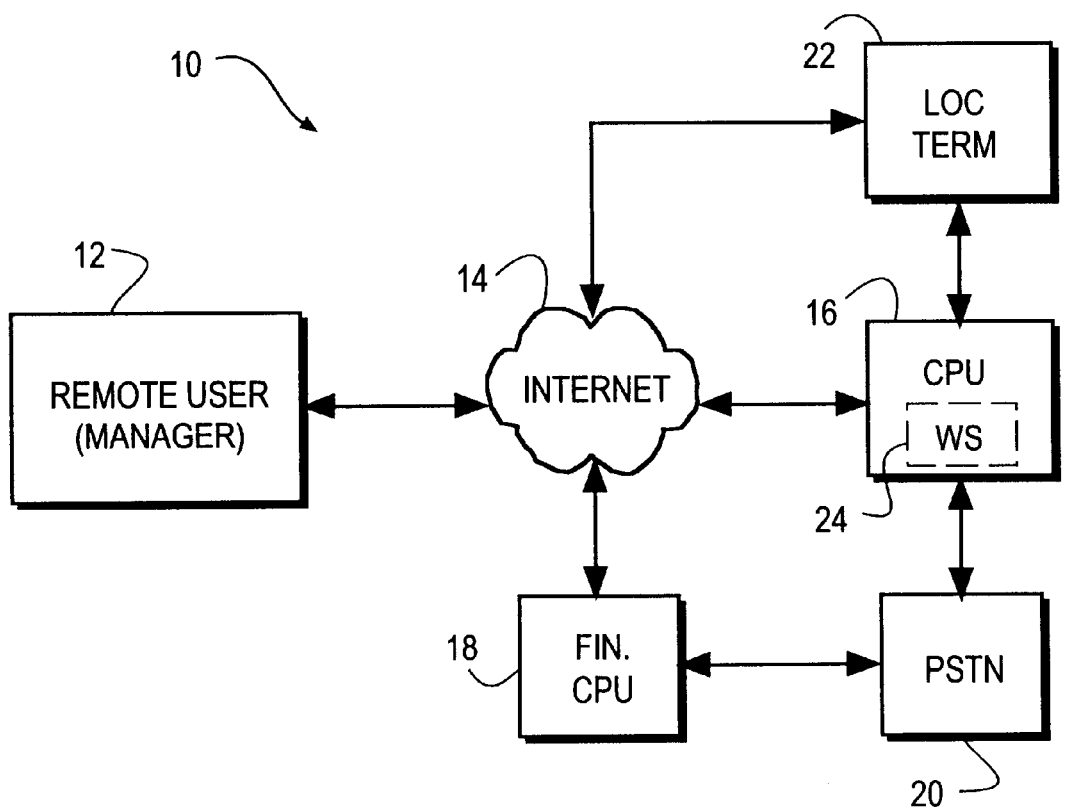
FIG. 1 is a block diagram of the system for remotely managing a real estate unit from a remote location in accordance with an embodiment of the invention.

FIG. 1 is a block diagram of a system 10, shown generally, for remotely managing a real estate unit (not shown) under an illustrated embodiment of the invention. Under the embodiment, a CPU 16 may receive and process information about the real estate unit from a local terminal 22, a financial institution 18, or a real estate manager working through a remote user terminal (the manager and terminal hereinafter sometimes together referred to as a "manager 12"). The CPU 16 is provided with a set of software programs that when executed by the CPU 16 function as a server (the programs and CPU hereinafter sometimes together referred to as server 16).

As used herein, a real estate unit may include, but is not limited to, residential or commercial rental units or rental storage space. A real estate unit may also be a condominium unit, building or any facility for which the real estate manager performs maintenance management services for the owner.

A real estate unit may also be rental space in 4 mini-warehouse, a boat slip at a marina or commercial space in a retail strip shopping center. The real estate unit may be space in an office building or rental of manufacturing apace.

Also as used herein, management may include, but is not limited to, acting as a authorized agent of an owner for a real estate unit in any matter regarding the unit. Acting as an agent may include contracting for rental or sale of a unit or for providing such services as repair, upkeep and cleaning. Management may also include acting as an authorized agent for receiving rental receipts or for making payments for the real estate unit's financial obligations (e.g., mortgage, taxes, assessments, etc.).

Under the illustrated embodiment, the CPU (server) 16 provides a website 24 which the real estate manager 12 may access from a remote location through the Internet 14 from virtually any location worldwide. Through the website 24, the manager 12 may receive information and perform specific management functions as more specifically set forth below.

The CPU 16 may also receive information (e.g., rental income information, check clearing data, etc.) from one or more financial institutions 18. The information from a financial institution 18 may be forwarded to the CPU 16 under any of a number of formats. For example, the information may be forwarded directly through the Internet. Alternatively where security is a concern, the information may be forwarded through the public switched telephone network 20 using a modem.

Finally, the CPU 16 may also receive information from any of a number of local terminals 22, either connected directly to the CPU 16 or through the Internet. The local terminals 22 may receive and forward data to the CPU 16 from an information processing service, such as a check processing service which logs receipt of rental payments, or which logs receipt of invoices. Alternatively, the local terminal 22 may be an accountant who receives and processes financial and tax information.

Figure 2:
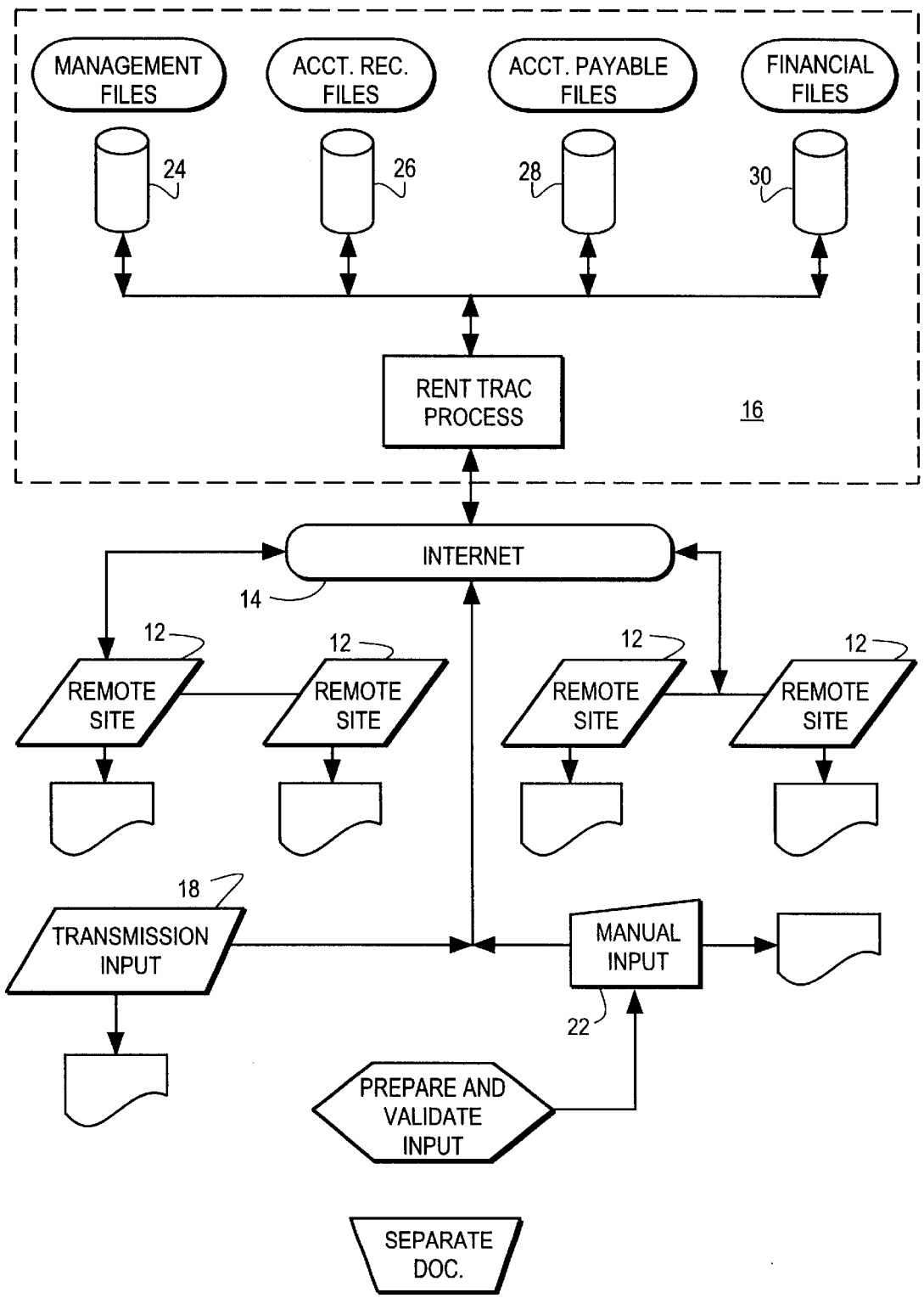
FIG. 2 is an information flow diagram of the system of FIG. 1.

FIG. 2 is a block diagram which shows an expanded view of information flow within the system 10 of FIG. 1. As shown, as data is processed by the CPU 16 it may be stored in any of a number of files. For example, maintenance information may be stored in a set of management files. Rental payments received from tenants on real estate units may be stored in a set of accounts receivable files 26. Payments to vendors, mortgage holders or employees may be stored in a set of accounts payable files 28. Information about cash flow, tax information, etc. may be stored in a set of financial files 30.

In order to manage a set of real estate holdings, the manager 12 may access the CPU 16 through the Internet. In order to access the CPU 16, the manager 12 retrieves an IP address of the website 24 and transmits an access request to the website 24 through the Internet 14. The website 24 responds with a webpage identifying the system 10 and requesting the entry of an identifier (e.g., name, password, etc.) of the manager through a data entry window.

The webpage may be downloaded as a HTML file which not only functions to prompt and inform the manager 12, but also to facilitate the return of data and commands to the server 10. Included within the HTML file may be a set of JAVA commands (e.g., an applet) that may form one or more subroutines that may be executed by the terminal of the manager 12. (The term "subroutine" is used generically herein to refer to the ability of a user to access separate computer applications within the server 16 based upon a different code plug embedded within each subroutine.) Execution of one particular subroutine over another of the applet depends upon the interaction between the manager and terminal 12 of the manager.

For example, if the webpage contained a menu of two choices, then it may be assumed that the applet contains two subroutines. Selection of the first choice would cause the terminal 12 to execute the first subroutine. Execution of the second choice would cause the terminal 12 to execute the second subroutine.

Execution of the first (or second) subroutine may causes the terminal 12 to compose a message for transmission back to the server 10. Included within the message may be an internet protocol (IP) address of the terminal 12, an identifier of the webpage from which the subroutine originates, the code plug of the selected choice and the IP address of the server 16. In the case where the server 16 requests an identifier, the message would also contain any name and/or password of the manager entered through the data window.

Upon entering a password, the terminal 12 may send the message to the server 16, at the IP address of the website 24. The server 16 upon receiving the message may identify the message and format as being associated with one of its webpages through the identifier of the webpage. The server 16 may then identify (based upon the code plug) the particular computer program which processes identifiers of managers 12 and which ultimately grants access (the server access application).

Upon identifying the access application, the server 16 passes the IP address and identifiers of the manager 12 to the server access application. The access application compares the identifiers against a number of known authorized identifiers (e.g., passwords). When a match is found, the CPU 16 grants access by the manager 12, but only to a predetermined set of files.

It should be understood that the server 16 may contain files for any number or type of manager 12. For example, one group of managers 12 may be associated with a first real estate entity, while another group may be associated with a second real estate entity, unrelated by ownership or geographic area. As a result, the password of a manager 12 is unique and only allows the manager 12 to access files to which he has access rights within a secure portion of the server 16. On a first level, a manager 12 may only be allowed access to files of the real estate entity of which he is associated. However, even the manager's access to files of his own real estate entity may be limited based upon the type of manager 12 involved.

For example, one type of manager may be a building owner. The building owner may be given the highest level of access. Another type of manager may be an accountant performing an organizational audit. An accountant may be given a lower level of access. A third type of manager may be a building manager. The building manager may be given the lowest level of access.

For example, an owner may be given access to all files associated with his real estate units. A building manager may only be given access to occupancy information (e.g., name of renter, occupation, whether the rent has been paid for a current rental period, etc.).

Following processing and acceptance of the password, the access application of the server 16 may grant system access by the manager 12 to a set of secure programs within the server 16 (the secure programs and CPU together sometimes hereinafter referred to as the secure server 16). The access application may grant access by transferring the IP address of the manager 12 and an access spec to a user service module of the secure server 16. The access spec may be an access file containing a property identifier and list of files to which the manager 12 is entitled access. The user service application may simply be a routine within the secure server 16 which services the manager 12 during a current session.

Figure 3:
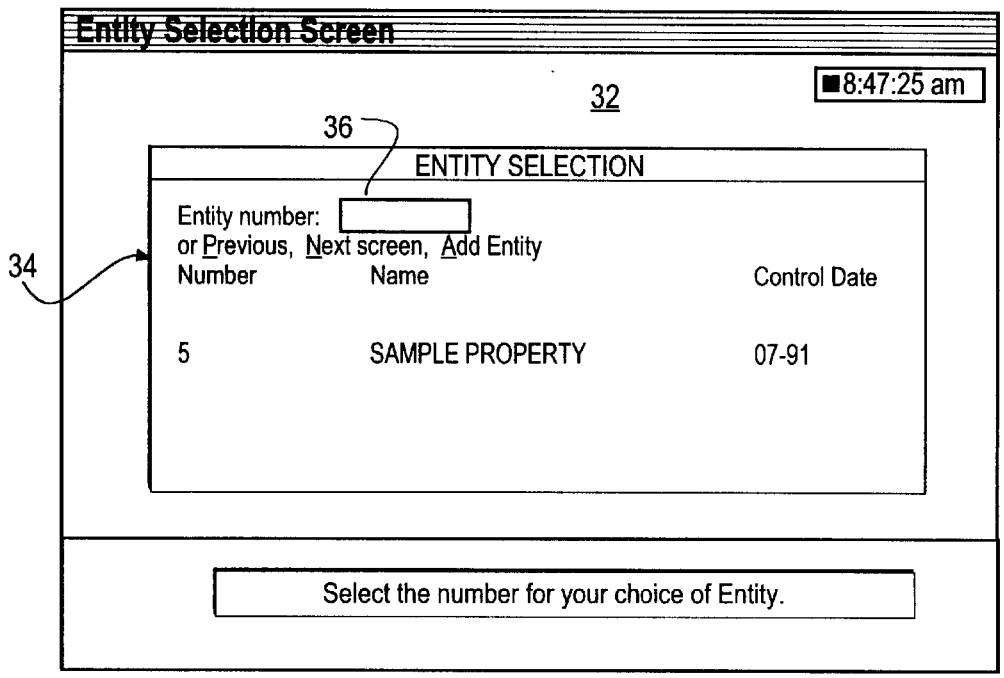
FIG. 3 is an initial menu presented to a user of the system of FIG. 1.

Once the service module receives the IP address and access spec of the manager 12, the service module may transfer another web page (and applet) to the manager 12. The web page may request that the manager 12 identify a real estate unit. While a real estate unit could be an individual real estate unit, the real estate unit could also be a building containing any number of real estate units. FIG. 3 depicts an entity selection screen 32 that may be presented to a remotely located manager 12, as an aid to unit selection.

Shown on the entity selection screen 32 may be one or more line entries 34 containing descriptive information about real estate units. Included within the descriptive information may be a unit number (e.g., 5) and name of the property (e.g., an address or commonly used name).

While the line entries 34 of screen 32 could be to a single real estate unit, it should be understood that entry 34 could be any designation. For example, each line 34 of screen 32 could be to a different rental apartment, to a rental building (each containing many apartments) or to a rental complex (each containing many buildings and each with many apartments).

Figure 4:
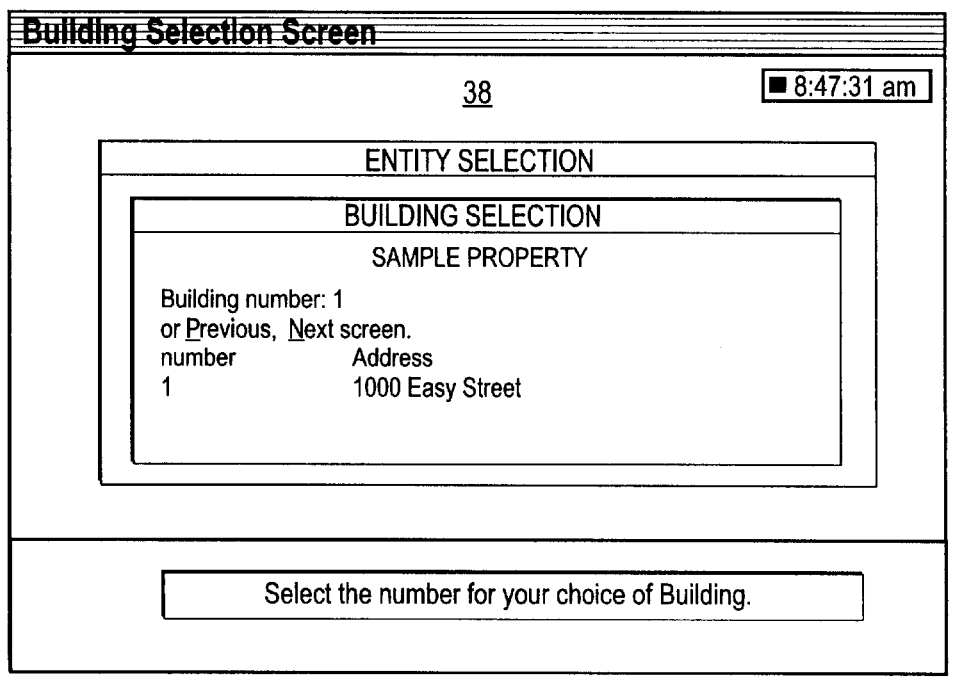
FIG. 4 is a unit selection menu of the system of FIG. 1.

To select a unit, the manager 12 may enter a unit number (e.g., 1) into a data entry window (box) 36 on the screen 32. The manager may then activate an "ENTER" key or "N" to transmit the selection back to the secure server 16 with the appropriate code plug. The secure server 16 may respond with the screen 38 of FIG. 4, which identifies the address of the property (e.g., 1000 Easy Street).

The manager 12 may activate "ENTER" or "N" again and arrive at the main menu 40 (FIG. 5) for the unit. Shown in the main menu are selections for: 1) Inquiry, 2) Billing & Cash Entries, 3) File Maintenance, 4) Reports, 5) Utilities and 6) System. From the main menu 40 (and with the appropriate selection of code plugs and data windows) a manager 12 is able to access and interact with any application present on the server 16 from any location throughout the world.

Figure 6:
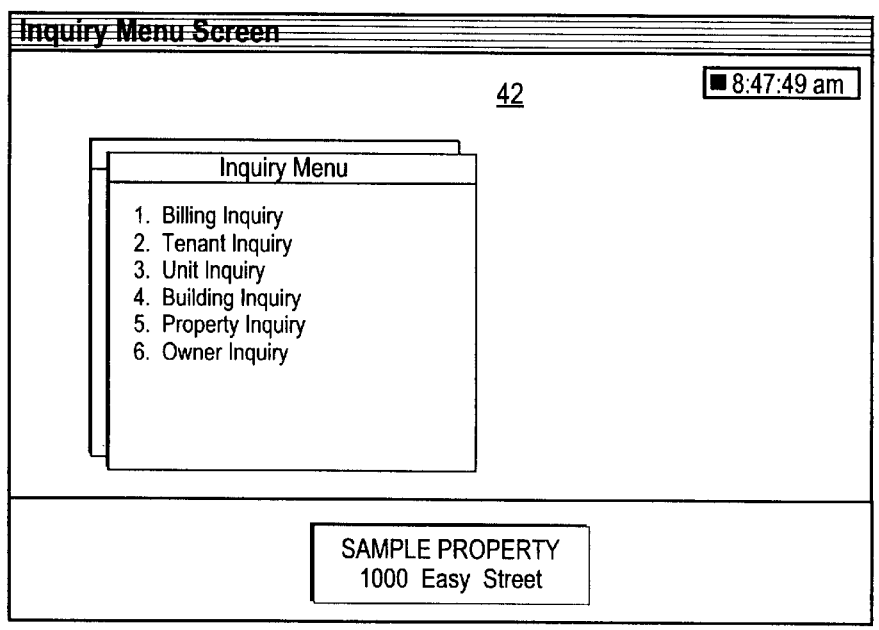
FIG. 6 is an inquiry menu of the system of FIG. 1.
Figure 7:
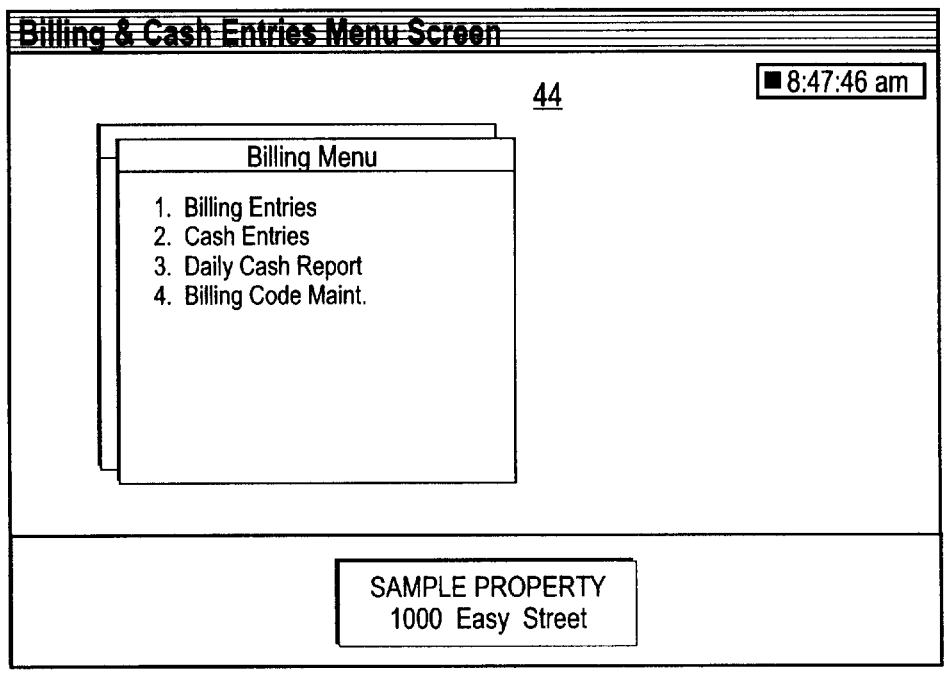
FIG. 7 is a billing menu of the system of FIG. 1.
Figure 8:
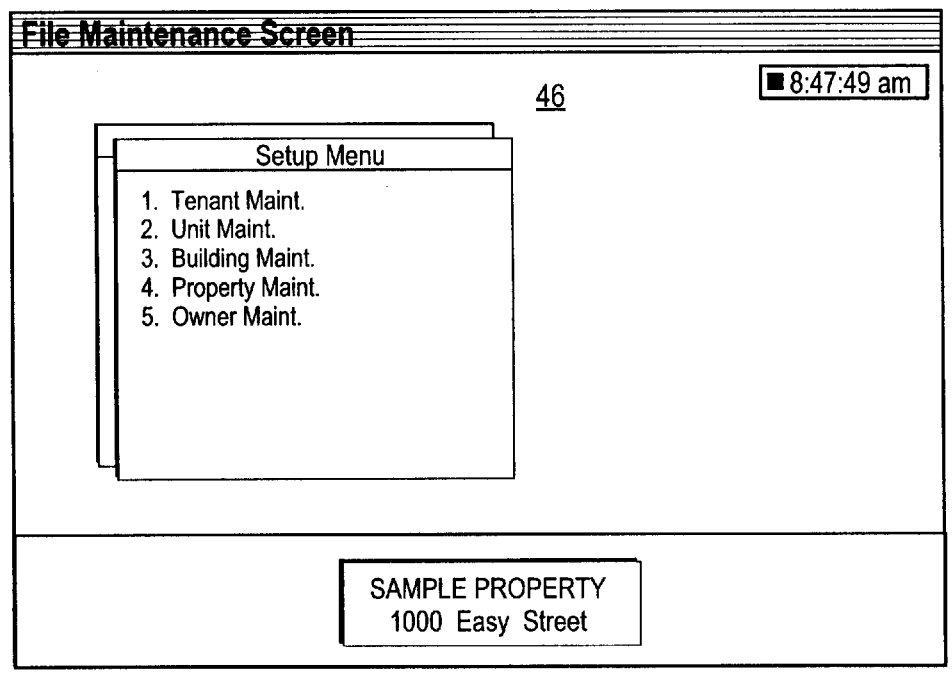
FIG. 8 is a setup menu of the system of FIG. 1.
Figure 9:
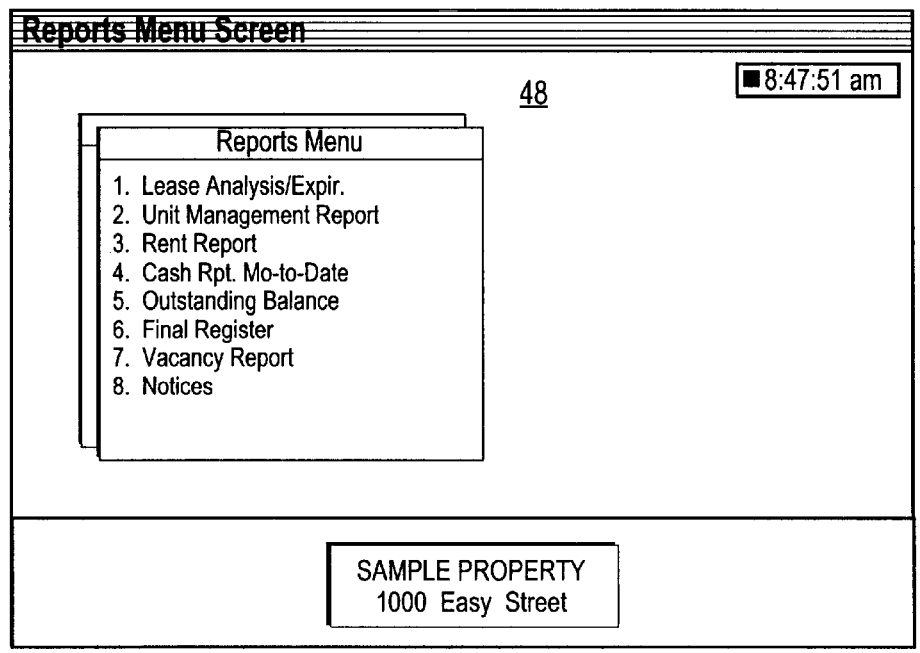
FIG. 9 is a reports menu of the system of FIG. 1.
Figure 10:
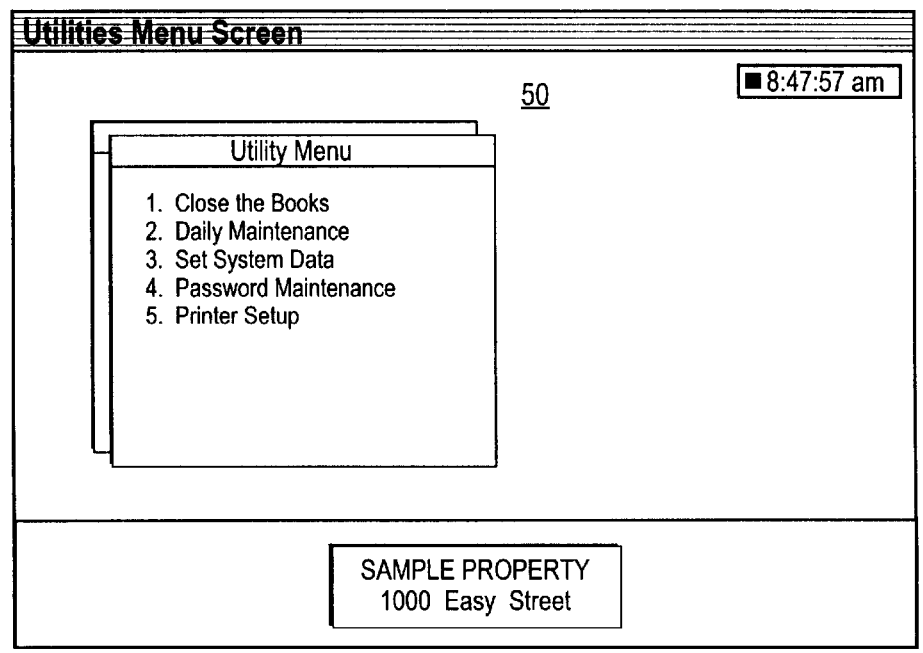
FIG. 10 is a utility menu of the system of FIG. 1.

The first selection "1 Inquiry" may be used to allow the manager to obtained detailed information for the selected unit, as shown by the detail screen 42 of FIG. 6 displayed in response to selecting the first option. The second selection "2 Billing & Cash Entries" allows the manager to monitor the selected unit's cash position by selection of further options from screen 44 of FIG. 7. The third selection "3 File Maintenance" allows the manager to modify data upon which the data of previous screens were based by selection of further options from screen 46 of FIG. 8. The fourth selection "4 Reports" allows the manager to view any of a number of financial and regulatory reports by selection of further options from screen 48 of FIG. 9. The fifth selection "5 Utilities" allows the manager 12 to perform system functions by selection of one of the options from screen 50 of FIG. 10. The last selection "5 System" allows the manager to exit the managerial functions of the system 10 by selection of one of the options of screen 52 of FIG. 11.

As mentioned above, when the manager 12 selects the first option (i.e., "1 Inquiry") of screen 40, an additional detail screen 42 appears. If the manager 12 were to desire detailed billing information about particular real estate units, the manager 12 then selects the first option (i.e., "1 Billing Inquiry") of screen 42.

Selection of an option may occur under any of a number of different methods. For example, the manager may enter the numeral "1" followed by activation of the "ENTER" key. Alternatively, the manager 12 may highlight the option and activate the "ENTER" key.

It should be understood that upon activation of a request for any screen, the server 16 first (using the access spec) retrieves a set of access rights (e.g., an access level) for the manager 12 and compares the manager's access right with the access level of the requested screen. If the manager's access level gives the manager 12 access rights to the requested screen, then the CPU 16 returns the screen. If not, then the manager's request is denied.

Figure 12:
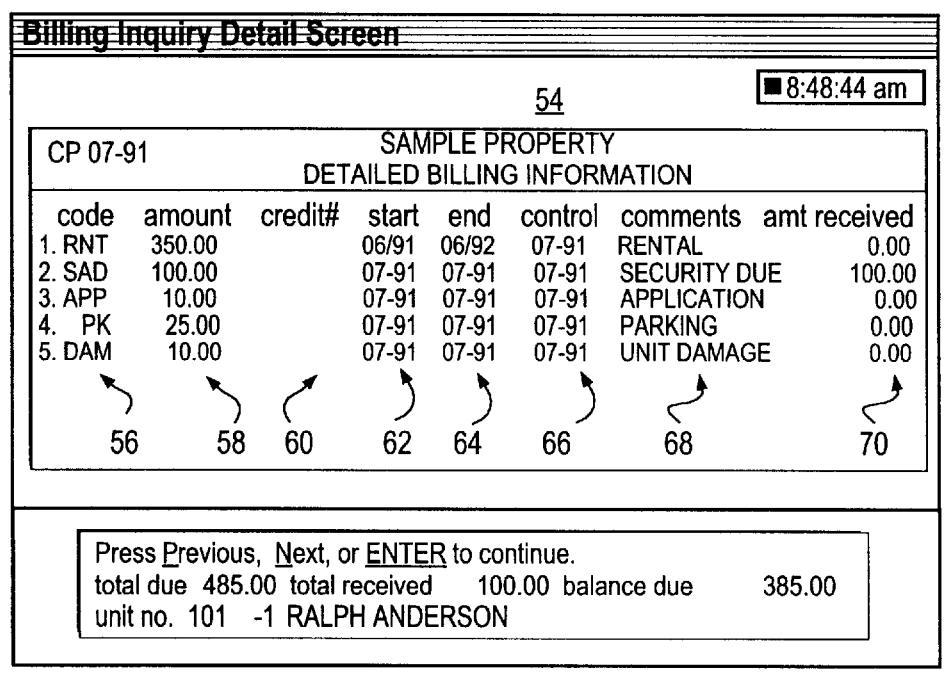
FIG. 12 is a billing inquiry detail screen of the system of FIG. 1.

If in response to pressing the numeral "1" the CPU 16 determines that the manager 12 has the proper access rights, the screen 54 of FIG. 12 may appear, giving a detailed billing summary of a particular unit (in this case Unit No. 101-1, held by a Ralph Anderson). As shown, a first column 56 may show a line code. A second column 58 may show an amount for that code.

For example, the first line of screen 54 may have a line code of "RNT" in the first column 56 as an indication of a rental amount for the unit. The amount on line 1 in the location of the second column 58 may have a rental amount of $350.00 as a rental amount for that unit.

A third column 60 may show any credits for the unit. For example, some rental units may receive a reduced rental amount for the first 90 days after an initial rental lease is signed.

A fourth and fifth column 62, 64 may show a starting and ending date for that rental rate for the period shown in the billing summary of the screen 54. A sixth column 66 may show a control number (e.g., a date when the summary was last modified, a date a lease was executed, etc.).

A column 68 may also be provided for explanatory comments or for other information relating to a particular entry of the billing summary. A final column 70 displays any amounts received on the unit for the rental period.

Upon examining the data of screen 54, the manager 12 may activate a return key or a key to proceed to another rental unit. To proceed to another unit in the selected unit (i.e., located at 1000 Easy Street), the manager 12 may activate "N". Activation of this key causes the server 16 to display information regarding the second, or subsequent, units (e.g., unit number 101-2). Similarly, the manager 12 may activate a "P" key to go to a previous unit.

If the manager 12 were to activate the return key (e.g., "ENTER"), then screen 42 would again be displayed to the manager at the managers terminal 12. From screen 42, the manager may select any of the six options.

If the manager 12 were to select the second option (i.e., "2 Tenant Inquiry", then screen 72 of FIG. 13 may be sent to the manager 12. Included on the screen would be a unit number (e.g., "101-1" as in the previous example) 74 and a unit type (e.g., 1 bedroom, 2 bedroom, etc.) 92.

In the case where the real estate unit is subsidized housing, the screen 72 may include a "hud" number (e.g., a Section 8 certification number) 96. Also included may be a certification date 94.

Also included on the screen 72 may be move-in and move-out dates 76, 90 and lease start and lease end dates 78, 80. Where the unit is a renewal lease, provisions are available for beginning and end dates 98, 100.

The screen 72 includes a field 102, 104 for the names of tenants or owners, including social security numbers, occupations, and emergency contacts. Provisions 106 are also made to identify the presence of children, pets and automobiles kept by the occupants of the unit.

As above, the manager 12 may enter "N" to advance to the next unit or "P" to return to the previous unit. Alternatively, the manager 12 may activate "ENTER" to return to the menu of screen 42.

Where the manager 12 returns to the menu shown in screen 42, the manager 12 may then select "3 Unit Inquiry" as a selected option. Selection of Unit Inquiry provides information regarding the particular real estate units.

For example, screen 108 of FIG. 14 provides an example of the types of information available on a Unit Inquiry screen. As shown, a location for a unit number 110 (e.g., unit #101-1 occupied by Mr. Anderson of FIG. 12) may be provided along with indication 112 of the type of real estate unit (e.g., residential rental, owned condo, storage locker, etc.).

A certification field 114 is provided for a HUD certification under Section 236 for public housing purposes. An address location 120 is provided along with an availability date 118.

Also provided are a number of fields relating to marketing efforts of the real estate unit. For example, where marketing surveys have been performed, a field 124 is provided for an average market return obtained by comparable units. Another field 122 shows an actual return for the unit. A third field 126 shows a contract return where federal and state subsidies provide a portion of the actual return.

A field 130 is provided for a class of unit (e.g., commercial, residential, etc.). Included within the field 130 is such information as a number of rooms, bedrooms and bathrooms.

A field 132 is provided to show when the unit was last decorated. As a further indication of the decor of the unit, one field 134 shows when carpet was last installed, a second field 136 shows when it was last cleaned and a third field 138 indicates the color.

A field 140 is provided for the square footage of the unit. An indication 142 may be provided as to the percentage of the unit carpeted or for the percentage that the unit occupies of the building as a whole.

The revenue year-to-date is provided in another field 144. Another field 146 provides a general ledger account (e.g., in the case of commercial property).

Another feature is a field 148 for appliances installed within the unit. A first part of the field identifies the appliance, while a second part shows a purchase and warranty date. An identifier (ID) may be provided. A 3-month and 1-year reminder are also provided for preventive maintenance.

After reviewing the screen 108, the manager 12 may enter "N" to advance to the next unit or "P" to return to the previous unit. Alternatively, the manager 12 may activate "ENTER" to return to the menu of screen 42.

Where the manager 12 returns to the menu 42, the manager may select "4 Building Inquiry". In response, the screen 150 of FIG. 15 may appear on the terminal 12 of the manager.

Where the real estate unit is part of a complex of buildings, the screen 150 may include a field 152 for a building number and a second field 153 for a building address. A field 155 is provided for an invoice address, for example where rent is to paid to lock box of a particular financial or accounting entity.

Another field 154 is provided for building details, such as construction date, type of construction and gross rental area. A portion of this field 154 is dedicated to a gross potential and market potential. Gross potential is determined based upon an average rental rate (for the geographic area of the unit) times the overall rental area. Market potential is typically based upon market studies based upon the type of rental unit.

Also included within the building detail field 154 is a year-to-date vacancy rate for the building. A general ledger account number is also provided for commercial rental buildings. A portion of the building detail field 154 is also reserved for a real estate tax rate of the building.

Included in the screen 150 is a field 156 for other building details. Included within this field is an entry for the number of floors in the building and the number of units. Also included is the number of one, two and three bedroom apartments.

A first and second fields 158, 160 are provided as to the environment of the building. The first field 158 provides an indication as to whether children or pets are allowed. Another portion of the first field 158 indicates whether the unit is furnished, or carpeted, or whether it has an elevator.

The second field 160 indicates the type of heating of the building and the type of air conditioning. A portion of the field 160 is also reserved for indicating whether the building has a washer or dryer.

A final field 162 of the building inquiry screen 150 indicates the names, addresses and telephone numbers of maintenance persons. The information of the building inquiry screen 150 allows a manager from a remote location to quickly assess tenant complains based upon the attributes of the building and respond with the appropriate maintenance service with a minimum of local support.

After reviewing the screen 150, the manager 12 may enter "N" to advance to the next building or "P" to return to the previous building. Alternatively, the manager 12 may activate "ENTER" to return to the menu of screen 42.

Where the manager 12 returns to the menu 42, the manager may select "5 Property Inquiry". In response, the screen 164 of FIG. 16 may appear on the terminal 12 of the manager. Screen 164 may be used for single building properties or properties with many buildings. As the reader may notice from FIG. 16, the information of the screen 164 is not particularly associated with any particular building, but is more intended to provide an overview of the property in general and therefor to provide a remote manager 12 with an overview of the property without the necessity of a personal visit.

A first field 166 provides in indication of the type of building located on the property. Also included within the first field 166 is an indication of when a fiscal year starts for the property, a construction date and a date of first occupancy.

A second field 166 indicates an environment of the property. The second field 166 may be used to indicate whether children or pets are allowed and whether the buildings are furnished. The second field 166 also provides an indication of whether the property has a swimming pool or tennis courts.

A third field 168 provides indication of the facilities available on the property. The third field 168 provides an indication of the number of buildings on the property as well as the number of units within the buildings. The number of carports and parking stalls is also included in the third field 168.

A fourth field 170 gives indication of the status of rental units. A first portion of the field 170 gives the gross rental area of the property. A second portion (ytd billed) gives indication of the area rented and billed and a third portion (ytd received) gives indication of area for which rents have been collected. A third portion gives an indication of the areas which are vacant.

A fifth, sixth and seventh field 172, 174, 176 provide indication of cash flow for the property. The fifth field 172 provides indication of the utility costs paid by the property owner.

The sixth field 174 gives a current cash status. For instance, a "last batch number" provides a batch number and date for the last accounting update to the property's balance sheet. A last batch amount is provided for a dollar value of the last batch along with a month total for the batch amount.

An eighth field 176 is provided for late fees. A late limit is provided as well as charges for incremental late periods.

A ninth field 178 is provided for appliances contained within the property. The number of each type of appliance is provided as well as an indication as to whether the property owner owns the appliances or some other entity (e.g., a rental agency). An identifier is provided as to who is responsible for servicing the appliances as well as an indicator as to the contract terms under which the appliances may be serviced.

After reviewing the screen 164, the manager 12 may enter "N" to advance to the next property or "P" to return to the previous property. Alternatively, the manager 12 may activate "ENTER" to return to the menu of screen 42.

Where the manager 12 returns to the menu 42, the manager may select "6 Owner Inquiry" (FIG. 17). In response, an owner screen 180 may be presented to the manager 12.

It should be understood that while an auditor or building owner would probably be allowed access to the information of the owner inquiry screen 180, a building manager would not be. Accordingly, it should be kept in mind that for every screen request made by the manager 12, the server 16 verifies that the manager 12 is authorized to access that screen. If the manager 12 is authorized, then access is granted. Otherwise, access if denied.

Included within the owner inquiry screen 180 is a first field 182 for identification of the property. Included within the field 182 is a property number, a control date (e.g., acquisition date) and an address.

The owner inquiry screen 180 also contains three other fields 184, 186, 188 indicative of ownership interests. The first field 184 may be the title holder (e.g., the corporation which holds title to the property). The second field 186 may identify any mortgagees of the property. The third field 188 may either be the title holders or investors in the title holder.

The owner inquiry screen 180 allows a manager with the proper access rights to quickly and easily identity the proper party should an owner's decision be necessary to the efficient and proper operation of the unit. The owner inquiry screen 180 also allows for the quick identification of loss payees should an insurance loss be experienced on the unit.

After reviewing the screen 180, the manager 12 may enter "N" to advance to the next property or "P" to return to the previous property. Alternatively, the manager 12 may activate "ENTER" to return to the menu of screen 42.

Where the manager 12 returns to the menu 42, the manager may select another option on screen 42 or return to the main menu of screen 40. To return to the main menu, the manager 12 may again activate the "ENTER" key. Upon activating the "ENTER" key a second time the main menu 40 is presented to the manager.

Once returned to the main menu 40, the manager 12 may activate another selection (e.g., "2 Billing & Cash Entries"). In response, screen 44 (FIG. 7) may be presented to the manager 12.

Should the manager 12 select the first entry "1 Billing Entries", the billing menu screen 190 of FIG. 18 may appear. While the screen 190 may appear very similar to screen 54 of FIG. 12, the function of screen 190 is very different.

For example, screen 54 is an inquiry screen which virtually any manager 12 would have access to. In contrast, screen 190 is an editing screen through which the data, inter alia, of screen 54 may be modified.

For example, the manager 12 may highlight (i.e., click on) box 194. The manager 12 may then activate box 192 to view a unit damages box (not shown). The unit damages box may show any previous damages recognized as existing within a particular unit.

Upon opening the damages box, the manager 12 may activate the "Add" box 194 to enter additional damage, as well as enter a charge against the tenant for the damage. Alternatively, the manager 12 may highlight individual items in the damages box and activate the "Delete" box 196 to delete any damage item after repairs have been made.

Similarly, the manager 12 may alter any of a number of billing details regarding a rental unit. When the manager 12 completes any necessary changes, he may proceed to a next rental unit or previous unit. The manager 12 may also activate a "QUIT" button to exit the editing function. Upon exiting the edit function, the manager 12 would return to the billing menu 44 of FIG. 7.

The manager 12 may now select "2 Cash Entries" and be taken to a cash entry screen 200 of FIG. 19. The cash entry screen 200 may be used to track a cash status of any particular real estate unit (e.g., unit #1-101, held by Ralph Anderson at 1000 Easy Street).

Upon selecting the cash entry screen 200, the manager 12 may select or modify a rental code 202. The code 202 may identify the type of transaction (e.g., rental, damage, etc.). A start and end date 204, 206 are provided to indicate the period of the cash entry.

A charge box 208 is provided for entry of the amount of the charge. Any amounts already received are shown in a received box 210.

A credits box 212 is provided to show any credits given or amounts already held (e.g., security deposit). A balance box 214 shows any amounts still due. A amount applied box 216 may be used to show any credit or received amount that has been applied to a particular charge.

Upon activating an ENTER button 218 a "Cash Entry Screen 2" 220 may be presented showing a summary of cash transactions for the unit. While the first cash screen 200 may be used by the manager 12 to enter individual values, the second cash screen 220 may be used to view cash transactions received from other sources (e.g., rental receipts received by a bank 18 and transferred to the server 16 via a local area network (LAN), or otherwise).

Shown at the bottom of the second cash screen 220 are entries 222, 224, 226 for cash received on a rental unit, the amount applied and the amount unapplied. Using a cursor (not shown), the manager 12 may edit the entries of the screen 220 to apply any received dollar values to the appropriate charges.

After applying any received amounts to the charges, the manager 12 may again activate the ENTER button 228 to reach a final cash entry screen 230. The final cash entry screen 230 is provided to show the manager 12 a final disposition of cash applied and unapplied. After viewing the changes, the manager 12 may activate a QUIT button 232 to return to the cash entry menu 44 of FIG. 7.

To modify the format and composition of the cash entry screens 200, 220, 230, a billing code maintenance facility is provided on the cash entry menu 44. The billing code maintenance facility is accessed by selecting "4 Billing Code Maint." from the cash entry screen 44.

Upon selecting "4 Billing Code Maint.", the screen 234 of FIG. 22 is provided to the manager 12. Using the billing code entry screen 234, the manager 12 may add or delete charges and charge codes. In a first column 236, the manager 12 may enter an identifier of the charge code. A second column 238 is provided to specify an account to which charges are to be credited.

Figure 5:
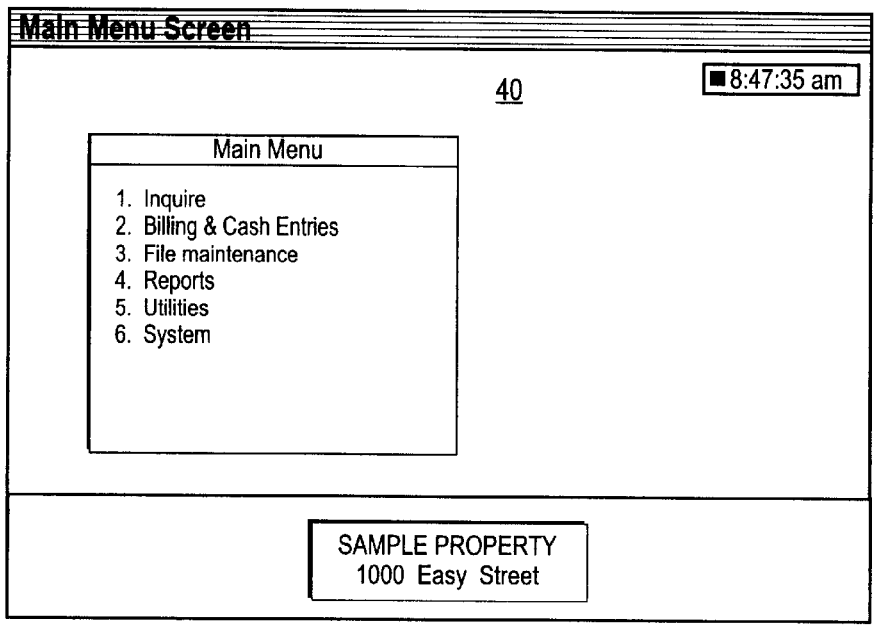
FIG. 5 is a main menu of the system of FIG. 1.

Once changes have been entered into the billing code maintenance screen 234, the manager 12 save the changes and exit or exit with no changes. In either case, the manager 12 returns to the billing menu screen 44. Upon activating ENTER from the billing menu screen 44, the manager 12 returns to the main menu 40 (FIG. 5).

From the main menu 40, the manager 12 may select "4 Reports". Upon selecting reports, the manager 12 is taken to screen 48 of FIG. 9. From the reports menu 48, the manager 12 may view any of a number of reports regarding his rental units. For example, a lease analysis/expiration report may be provided which provides an overview of the rental status of his units. The report may indicate a number of vacant as well as occupied units. A summary of expiration dates may be provided of the occupied units.

Another report that may be selected is a unit management report. The unit management report may be used to evaluate local building managers and make adjustments or recommendations as required.

A rent roll report may be provided. The rent roll may indicate the names of all renters. The rent roll may be displayed on a cumulative basis or based upon rental unit.

A cash report may be provided. The cash report may be provided by unit, by building, or by rental complex. A separate report may also be retrieved on outstanding balances, both on rental units and accounts due.

A final register report may be provided. The final register report may provide an overall summary of the financial position of the manager's rental units.

A vacancy report may be provided as well as a notices report. The notices may provide advance notice of renters giving notice of an intent to vacate. The vacancy report, notices report and unit management report may be used by the manager 12 as a measure of the performance of local building managers.

Upon selecting appropriate reports for any purpose, the manager may activate ENTER to return to the main menu 40. From the main menu 40, the manager 12 may select UTILITIES.

The selection of UTILITIES from the main menu 40 takes the manager to the utilities menu 50 of FIG. 50. Selection of the utilities menu 50 accesses certain utility programs available on the server 16. For example, by selecting "1 Close the Books", the manager 12 may activate an accounting program which performs a final accounting for a selected time period.

Alternatively, the manager 12 may activate "2 Daily Maintenance" to retrieve a maintenance log of selected units or building. The log may be based upon job tickets filled out by maintenance personnel on a daily basis. Such log allows a manager 12 to monitor work performance without direct involvement.

System date may be selected from the utilities menu 50. The date may be set upon system startup and periodically changed when necessary (e.g., to accommodate daylight saving time).

Password maintenance may also be selected from the utility menu 50. Passwords may be modified through this utility as necessary as may the file access rights of other managers 12.

A printer setup facility is also provided. The facility allows for the routing of reports from the reports menu 48 to either a local or remote printer as necessary for the convenience of the manager 12.

The manager 12 may exit from the utilities menu 50 to the main menu by activating ENTER. From the main menu 40, the manager 12 may select "6 System".

Figure 11:
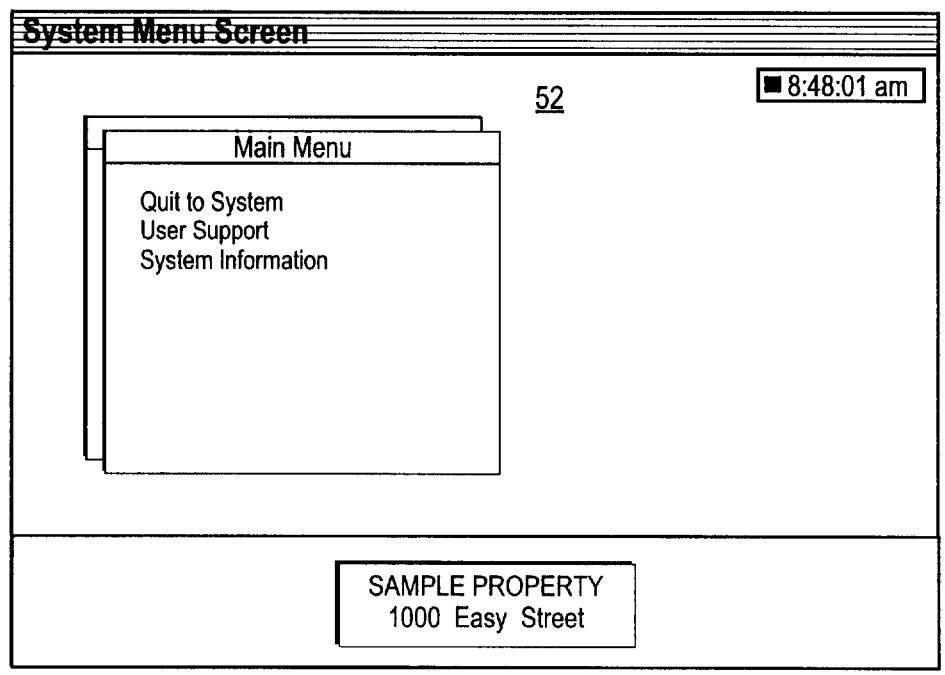
FIG. 11 is a system menu of the system of FIG. 1.

The selection of system takes the manager 12 to the system menu 52 of FIG. 11. From the system menu 52, the manager 12 may exit from the rental management utility to access other features of the server 12 (e.g., to retrieve other information stored by the server 16. The manager 12 may also access a user support feature to obtain help in solving system problems by a local programmer. The manager 12 may also activate a selection to obtain system information from the server 16.

A specific embodiment of a method and apparatus for remotely managing a real estate unit according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of managing a real estate unit from a remote location, such method comprising the steps of:

accessing a server from a remote location through a website of the server;

downloading a set of options regarding the managing of day-to-day operations directly related to use by a renter of the rental unit from the website to the remote location;

selecting at least one of the options;

uploading the selected option from the remote location to the server; and executing the uploaded selected option by the server.

2. The method of managing the real estate rental unit as in claim 1 wherein the step of accessing the website further comprises transferring an identifier of a user to the server.

3. The method of managing the real estate rental unit as in claim 2 wherein the step of transmitting the identifier further comprises comparing the identifier with an identifier of an authorized user and granting access to a set of files when a match is found.

4. The method of managing the real estate rental unit as in claim 3 further comprising uploading rental receipt data from a designated financial institution to the server.

5. The method of managing the real estate rental unit as in claim 4 wherein the step of uploading the rental receipt data further comprises storing the rental receipt data in the set of files.

6. The method of managing the real estate rental unit as in claim 1 wherein the step of downloading a set of options further comprises providing a real estate unit inquiry selection as an option of the set of options.

7. The method of managing the real estate rental unit as in claim 1 wherein the step of downloading a set of options further comprises providing a billing and cash entries selection for a real estate unit as an option of the set of options.

8. The method of managing the real estate rental unit as in claim 1 wherein the step of downloading a set of options further comprises providing a reports selection as an option of the set of options.

9. The method of managing the real estate rental unit as in claim 1 wherein the step of downloading a set of options further comprises providing a utilities selection as an option of the set of options.

10. The method of managing the real estate rental unit as in claim 1 wherein the step of downloading a set of options further comprises providing a system selection as an option of the set of options.

11. Apparatus for managing a real estate unit from a remote location, such apparatus comprising:

means for accessing a server from a remote location through a website of the server;

means for downloading a set of options regarding the managing of day-to-day operations directly related to use by a renter of the rental unit from the website to the remote location;

means for selecting at least one of the options;

means for uploading the selected option from the remote location to the server; and means for executing the uploaded selected option by the server.

12. The apparatus for managing the real estate rental unit as in claim 11 wherein the means for accessing the website further comprises means for transferring an identifier of a user to the server.

13. The apparatus for managing the real estate rental unit as in claim 12 wherein the means for transmitting the identifier further comprises means for comparing the identifier with an identifier of an authorized user and granting access to a set of files when a match is found.

14. The apparatus for managing the real estate rental unit as in claim 13 further comprising means for uploading rental receipt data from a designated financial institution to the server.

15. The apparatus for managing the real estate rental unit as in claim 14 wherein the means for uploading the rental receipt data further comprises means for storing the rental receipt data in the set of files.

16. The apparatus for managing the real estate rental unit as in claim 11 wherein the means for downloading a set of options further comprises means for providing a real estate unit inquiry selection as an option of the set of options.

17. The apparatus for managing the real estate rental unit as in claim 11 wherein the means for downloading a set of options further comprises means for providing a billing and cash entries selection for a real estate unit as an option of the set of options.

18. The apparatus for managing the real estate rental unit as in claim 11 wherein the means for downloading a set of options further comprises means for providing a reports selection as an option of the set of options.

19. The apparatus for managing the real estate rental unit as in claim 11 wherein the means for downloading a set of options further comprises means for providing a utilities selection as an option of the set of options.

20. The apparatus for managing the real estate rental unit as in claim 11 wherein the means for downloading a set of options further comprises means for providing a system selection as an option of the set of options.

21. Apparatus for managing a real estate unit from a remote location, such apparatus comprising:

a remote processor adapted to access a server from a remote location through a website of the server;

a website adapted to download a set of options regarding the managing of day-to-day operations directly related to use by a renter of the rental unit from the website to the remote location;

a cursor adapted to select at least one of the options;

an applet within the remote processor adapted to upload the selected option from the remote location to the server; and an applications program executing the uploaded selected option by the server.

22. The apparatus for managing the real estate rental unit as in claim 21 wherein the application program further comprises a comparator adapted to compare an identifier of an authorized user and granting access to a set of files when a match is found.

23. The apparatus for managing the real estate rental unit as in claim 21 further comprising a modem adapted to uploading rental receipt data from a designated financial institution to the server.

24. The apparatus for managing the real estate rental unit as in claim 23 further comprising a memory storing the rental receipt data in the set of files.

* * * * *

UNITED STATES PATENT AND TRADEMARK OFFICE
CERTIFICATE OF CORRECTION

PATENT NO. : 6,334,107
DATED : February 5, 2002
INVENTOR(S) : Hitoshi Tashiro

It is certified that error appears in the above-identified patent and that said Letters Patent is hereby corrected as shown below:

Drawings
In Figure 1, change the reference numeral "20" for the box labeled "POWER SOURCE" to the numeral -- 22 --.

Signed and Sealed this

Seventh Day of May, 2002

Attest:

JAMES E. ROGAN
Attesting Officer    Director of the United States Patent and Trademark Office

UNITED STATES PATENT AND TRADEMARK OFFICE
CERTIFICATE OF CORRECTION

PATENT NO. : 6,334,107 B1
DATED : December 25, 2001
INVENTOR(S) : Gale et al.

It is certified that error appears in the above-identified patent and that said Letters Patent is hereby corrected as shown below:

This certificate supersedes Certificate of Correction issued May 7, 2002, the number was erroneously mentioned and should be deleted since no certificate of correction was granted.

Signed and Sealed this

Third Day of September, 2002

*Attest:*

*Attesting Officer*

JAMES E. ROGAN
*Director of the United States Patent and Trademark Office*